US009734100B2

(12) United States Patent
Lewis (10) Patent No.: US 9,734,100 B2
(45) Date of Patent: Aug. 15, 2017

(54) NETWORK CONTROLLER SHARING BETWEEN SMM FIRMWARE AND OS DRIVERS

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 456 days.

(21) Appl. No.: 14/204,704

(22) Filed: Mar. 11, 2014

(65) Prior Publication Data

US 2014/0289436 A1    Sep. 25, 2014

Related U.S. Application Data

(60) Provisional application No. 61/803,974, filed on Mar. 21, 2013.

(51) Int. Cl.
G06F 3/00    (2006.01)
G06F 13/38    (2006.01)
G06F 13/24    (2006.01)
G06F 13/00    (2006.01)

(52) U.S. Cl.
CPC ................................ *G06F 13/24* (2013.01)

(58) Field of Classification Search
None
See application file for complete search history.

(56) References Cited

U.S. PATENT DOCUMENTS

| 7,003,607 | B1 | 2/2006 | Gulick |
| 2004/0268113 | A1 | 12/2004 | Rothman et al. |
| 2005/0080950 | A1 | 4/2005 | Rollig et al. |
| 2005/0114571 | A1 | 5/2005 | Shaw |
| 2008/0281475 | A1* | 11/2008 | Hirai ................ G05D 23/1931 700/300 |
| 2010/0017796 | A1 | 1/2010 | Walker et al. |
| 2013/0103961 | A1* | 4/2013 | Brooks ............... G06F 1/3203 713/320 |

FOREIGN PATENT DOCUMENTS

| TW | 200821823 A | 5/2008 |
| TW | 200834336 A | 8/2008 |
| WO | WO-2011162766 A1 | 12/2011 |

OTHER PUBLICATIONS

System Management Bus specification, Version 2.0, published on Auguest 3, 200; available from smbus.org/specs/smbus20.pdf.*
International Search Report and Written Opinion for Application No. PCT/US2014/023012, 10 pages, dated Aug. 29, 2014.

* cited by examiner

*Primary Examiner* — Scott Sun
(74) *Attorney, Agent, or Firm* — McCarter & English, LLP; John S. Curran (57) ABSTRACT

A mechanism for reducing the cost of providing network-based remote platform management by allowing system firmware to communicate with a remote platform administrator or process by sharing a NIC that is also used for normal network traffic is discussed. The dual use of the NIC reduces the cost of remote platform management by removing the need for a secondary controller or CPU core on the computing device that is dedicated to remote management tasks. Additionally, performance in the computing device improves as a byproduct of a CPU core or thread not being dedicated to the management task and instead being available for handling of other tasks.

20 Claims, 4 Drawing Sheets

NETWORK CONTROLLER SHARING BETWEEN SMM FIRMWARE AND OS DRIVERS

RELATED APPLICATION

This application claims the benefit of U.S. Provisional Patent Application No. 61/803,974, entitled "Network Controller Sharing Between SMM Firmware and OS Drivers", filed on Mar. 21, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

A computing device may contain one or more elements known as Central Processing Units (CPUs). These CPUs may have a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the memory locations allocated for SMM. The CPU may be directed to transition from normal operating mode to SMM by a number of triggers called System Management Interrupt (SMI) events. The exact triggers available differ somewhat among system designs but the result of an SMI being triggered is that execution in main memory is immediately suspended and execution begins at a specific location in SMM memory.

In addition to CPUs, computing devices include a number of other hardware components. These other hardware components may include a System Management Bus (SMBus) and one or more network interface controllers (NICs). The SMBus is a two-wire bus that provides lightweight communication with low-bandwidth devices on a motherboard. The devices can provide information over the SMBus that includes identifying information, their save state for a suspend event, and different types of errors, and can also accept control parameters and return device status. Exemplary devices that can communicate over an SMBus include power-related chips, temperature sensors, fan or voltage sensors, and clock chips, etc. NICs are used by computing devices for network communication. NICs may be built into the motherboard or may be provided via an expansion card plugged into a bus on the computing device. NICs implement the electronic circuitry required to communicate using a specific physical layer and data link layer standard and enable network communications through routable protocols, such as the Internet Protocol (IP). Incoming packets received via a NIC after an operating system has loaded may be provided to an operating system driver for handling. Among other attributes, the presence of a NIC in a computing device may also enable communication to take place between the computing device and a remotely located user or process looking to remotely manage the computing device.

BRIEF SUMMARY

Embodiments of the present invention reduce the cost of providing network-based remote platform management by allowing system firmware to communicate with a remote platform administrator or process by sharing a NIC that is also used for normal network traffic. The dual use of the NIC reduces the cost of remote platform management by removing the need for a secondary controller or CPU core on the computing device that is dedicated to remote management tasks. Additionally, performance in the computing device improves as a byproduct of a CPU core or thread not being dedicated to the management task and instead being available for handling of other tasks.

In one embodiment, a computing device-implemented method for remote platform management includes re-directing a selected network packet received via a NIC. The selected network packet is re-directed and transmitted as an SMBus packet over an SMBus to a target associated with a pre-defined SMBus address. An SMI is generated upon receipt of the SMBus packet by an SMBus host controller. The SMI triggers a transition to SMM by a CPU in the computing device. The contents of the SMBus packet are then retrieved by the system firmware. Based on a result of the examination, a reply SMBus packet is transmitted to the NIC and assembled into a network packet. The assembled network packet is transmitted via the NIC to a sender of the select network packets in order to establish a remote management connection between the sender of the network packets and the system firmware.

In another embodiment, a remotely managed computing device includes a CPU supporting SMM. The computing device also includes a NIC for receiving and transmitting network packets over a network. The NIC is configured to re-direct a selected network packet received via the NIC over an SMBus as an SMBus packet to a target associated with a pre-defined SMBus address. The computing device additionally includes an SMBus host controller for managing the SMBus. The SMBus host controller is configured to generate an SMI that triggers a transition to SMM upon receipt of the SMBus packet. The computing device further includes system firmware which when executed retrieves the SMBus packet from the SMBus host controller and examines its contents. Based on a result of the examination, an SMBus reply packet is transmitted to the NIC and assembled into a network packet. The assembled network packet is transmitted via the NIC to a sender of the selected network packets to establish a remote management connection.

In an embodiment, a computing device-implemented method for remote platform management, includes re-directing a selected network packet received via a network interface controller. The selected network packet is re-directed over a platform bus as a bus packet to a target associated with a pre-defined bus address. The method also generates a non-maskable interrupt with a bus host controller upon receipt of the bus packet. The non-maskable interrupt causes control of the computing device to shift to system firmware. System firmware retrieves the bus packet from the bus host controller and examines the contents. The firmware also transmits, based on a result of the examination, a reply bus packet to the NIC. The reply bus packet is assembled into a network packet at the NIC that is sent via the NIC to establish a remote management connection.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Network-based remote platform management is expensive from both a cost and resource perspective. Previous approaches to network-based remote platform management have included the use of a remote boot application or built-in management application, the use of a baseboard management controller or a management engine, required a separate NIC and/or attempted operating system and firmware hybrid approaches. As discussed further below, each of these previously attempted approaches suffers from one or more drawbacks, either by requiring additional hardware, lacking desired capabilities or requiring a dedication of system resources that negatively impacts platform performance.

In the case of a remote boot application or built-in management application, an application is launched from system firmware, a hard disk or a remote server (for example by PXE), and this application can perform the necessary communication with a remote management agent to report some system status (boot, sensors), perform some diagnostics and give access to the hard disk contents for remote provisioning. An example of this is Paragon's iSCSI Target Software. This approach provides pre-boot access to the platform and can be executed on every boot. However, the approach does not provide a continuous connection between the platform and a management application after the loading of the operating system and, in some cases, may not provide access to sensor information because the sensors are not discoverable or identifiable on the platform by the application.

A Baseboard Management Controller (BMC) is a general name for a wide variety of microcontrollers specifically designed for remote platform management. BMC controllers often implement the Intelligent Platform Management Interface (IPMI), Desktop and Mobile Architecture for System Hardware (DASH) and/or Alert Standard Format (ASF) platform management specifications, along with proprietary standards. BMCs often maintain power even when the rest of the system is unpowered. The BMC acts as an intermediary between the remote manager (using a network interface), the system firmware, the platform sensors and, in some cases, the operating system. In some cases, the BMC itself has a NIC integrated. In other cases, it uses a link with a special NIC (such as the Intel 82571) via SMBus or a proprietary interface. The BMC is not dependent on the system firmware or the operating system. The BMC requires either a dedicated network interface controller (NIC) or some means to share a NIC. The BMC is often a costly addition to a platform, both in component cost and software development cost (since it is often a different micro-controller with a different tool chain). The BMC also does not have access to all system information, since it cannot usually access the hardware registers, memory contents or CPU registers. Similarly, a Management Engine (ME) is a system controller located in many Intel chip sets that implements BMC-like functionality. Because it is built into the chipset, it also has additional access to system registers.

In another approach, a second, dedicated NIC may be used to communicate with the remote administrator. In this case, system firmware can be used with the dedicated NIC. However, the separate NIC is either hidden from the operating system or else modified to have a non-standard class code so that the operating system does not load a driver for it. The use of the separate NIC adds to the hardware cost and increases the complexity of the computing platform.

Alternatively, some systems have relied upon the operating system's and system firmware's BIOS capabilities to provide increased management functionality. Before boot, the firmware can remotely communicate with the administrator to provide log information and receive any update information through features such as Pre-boot Execution Environment (PXE), Internet Protocol Security (IPsec) and Unified Extensible Firmware Interface (UEFI) networking After boot, the operating system can provide this functionality through operating system drivers and services. This hybrid approach is a problem however because it requires a handoff between the firmware and the operating system and many operating systems may not support such a handoff. As a result, the board vendor cannot be sure if they have fully enabled platform management.

In contrast to these and other previous attempts to perform network-based remote platform management, the present invention allows network communication by the system firmware while an operating system is executing, without requiring either a separate NIC or a separate BMC. As discussed above, firmware has conventionally required a separate NIC that is hidden from the OS in order to communicate while an OS is running so that its access to the NIC hardware would not conflict with access by OS processes. Embodiments of the present invention utilize a second set of command registers provided by the network controller and second communication channel to provide access for the firmware. Given that BMCs cost additional money, separate NICs cost additional money and separate engineering expertise related to BMC firmware is hard to come by, the present invention represents a significant improvement over previous approaches of performing network-based remote platform management.

Embodiments of the present invention allow the system firmware to send and receive network packets using a NIC that is shared transparently with an operating system driver. As explained further below, the shared NIC is configured to re-direct a selected received network packet over an SMBus as an SMBus packet to a target associated with a pre-defined SMBus address that is monitored by the firmware instead of providing the network packet to an operating system driver. An SMBus host controller receiving the SMBus packet generates an SMI upon receipt which causes the CPU to transition into SMM. Once in SMM, system firmware examines the SMBus packet and responds via the NIC to establish a remote management connection with a sender of the received network packets. The system firmware can then communicate over the connection through the NIC while the computing device is operating in SMM in order to provide platform management information to the remote user or process.

Figure 1:
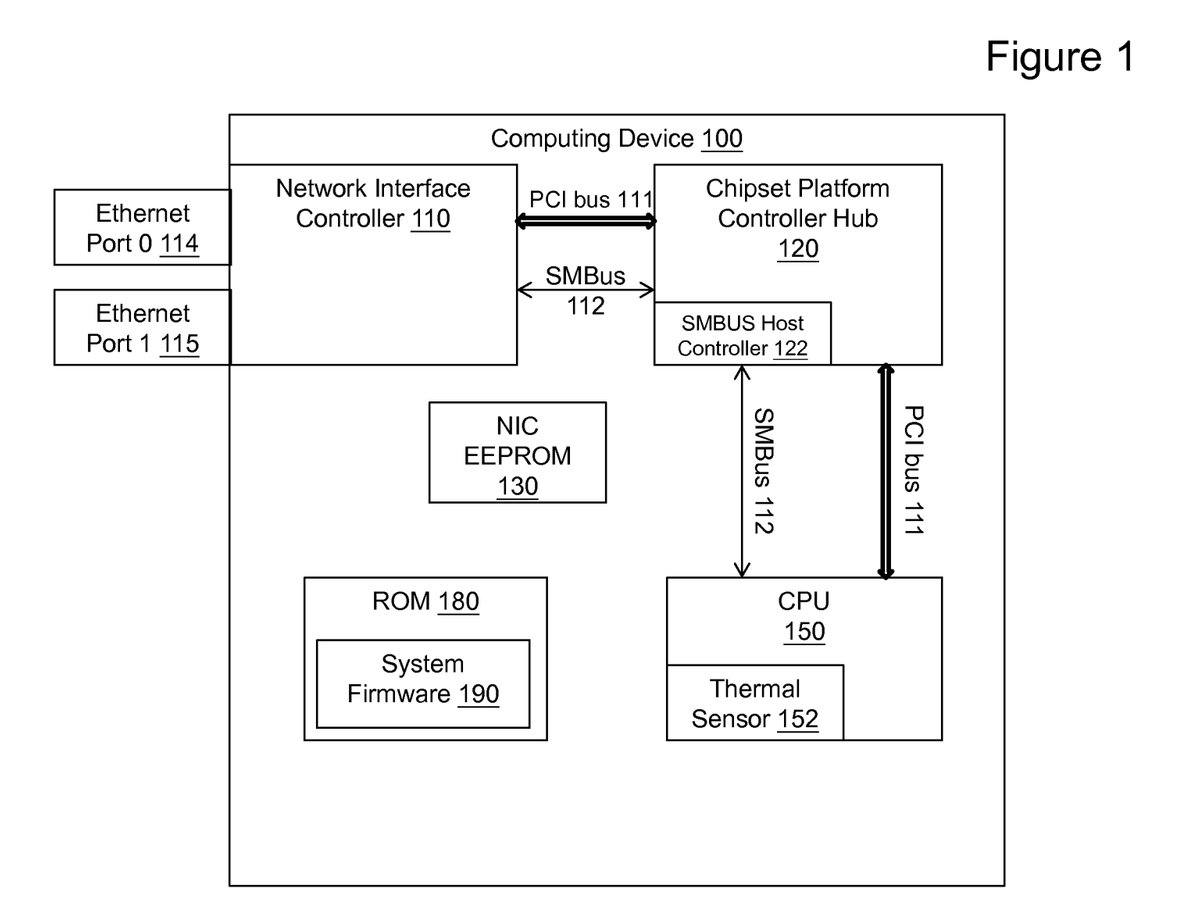
FIG. 1 depicts an exemplary computing device suitable for practicing an embodiment of the present invention.

FIG. 1 depicts an exemplary computing device suitable for practicing an embodiment of the present invention. A computing device 100 may include NIC 110, Chipset Platform Controller Hub 120 and a CPU 150. Computing device 100 may also include PCI bus 111 and SMBus 112 connecting NIC 110 and Chipset Platform Controller Hub 120. Further, computing device 110 may also include NIC EEPROM 130 holding a default configuration for NIC 110 and ROM 180 holding system firmware 190.

An exemplary NIC 110 is the Intel® 82571 network controller. NIC 110 may include multiple network interfaces and multiple different SMBus master/slave or slave end points. NIC 110 may include multiple Ethernet ports such as Ethernet port 0 (114) and Ethernet port 1 (115). NIC 110 is capable of re-directing specific network packets, based on a pre-defined filter, to be transmitted as an SMBus packet over the SMBus to a pre-defined SMBus slave address. NIC 110 can re-direct packets based on criteria specified using special SMBus commands sent to it or through a pre-defined configuration in the NIC's configuration in the NIC EEPROM 130. For example, NIC 110 may examine the Media Access Control (MAC) address in the received network packets (the NIC can provide a separate MAC address to simulate a separate network device) or by looking at the port of the packet (such as in the case of Remote Control Management Protocol (RCMP+) packets used by IPMI). The packets also may be filtered by content inspection. For example, specific SNMP (Simple Network Management Protocol) indices may be used. Likewise, NIC 110 may be capable of receiving packets sent to either of two SMBus slave addresses and retransmitting these over the network interfaces. NIC 110 provides built-in support for breaking network packets into SMBus packets (receiving) and assembling a network packet from the SMBus packets (sending). A default configuration of the controller may be found in NIC EEPROM 130 but other aspects of the NIC configuration can be set using SMBus commands.

Chipset Platform Controller Hub 120 is designed to work with CPU 150 and a memory controller, which provides I/O support for various peripherals. An exemplary Chipset Platform Controller Hub 120 is the Intel® 216 PCH. Chipset Platform Controller Hub 120 includes an SMBus controller 122 which can act as a master or slave. When a transaction is completed, SMBus host controller 122 can optionally generate a normal PCIe interrupt (per the PCI specification) or it can generate an SMI. All CPUs in a system, when they detect an SMI, interrupt execution at the next instruction boundary and begin execution in SMM. Typically, this execution location in SMM is in system memory set aside for this purpose, called System Management RAM (or SMRAM). The contents of SMRAM are initialized by the system firmware during initialization. Upon transition into SMM, the CPU begins execution at a pre-defined address, initialized by the system firmware, inside of SMRAM. An exemplary CPU 150 is the Intel® 5 Series CPU capable of executing in SMM.

Although reference to various Intel components have been made above and throughout, it should be appreciated that the embodiments of the present invention are not limited to the specifically described components and that other configurations providing similar functionality are within the scope of the present invention. For example, an embodiment may employ an SMBus host controller that is not located within Chipset Platform Controller Hub 120. In another embodiment, a NIC with similar functionality other than an Intel NIC from the 82571 family of GbE Ethernet controllers can be used. For example, a NIC that utilizes a sideband interface which allows network packets to be sent to and received by another agent other than the OS NIC driver may be used. This interface may handle Address Resolution Protocol (ARP) requests automatically and allow a filter to be applied so that only specific network packets are redirected to this secondary interface. This embodiment may include a secondary non-standard interface for the PCI device itself, or another sort of bus (such as Controller Area Network (CAN) and eye-2-C).

Figure 2:
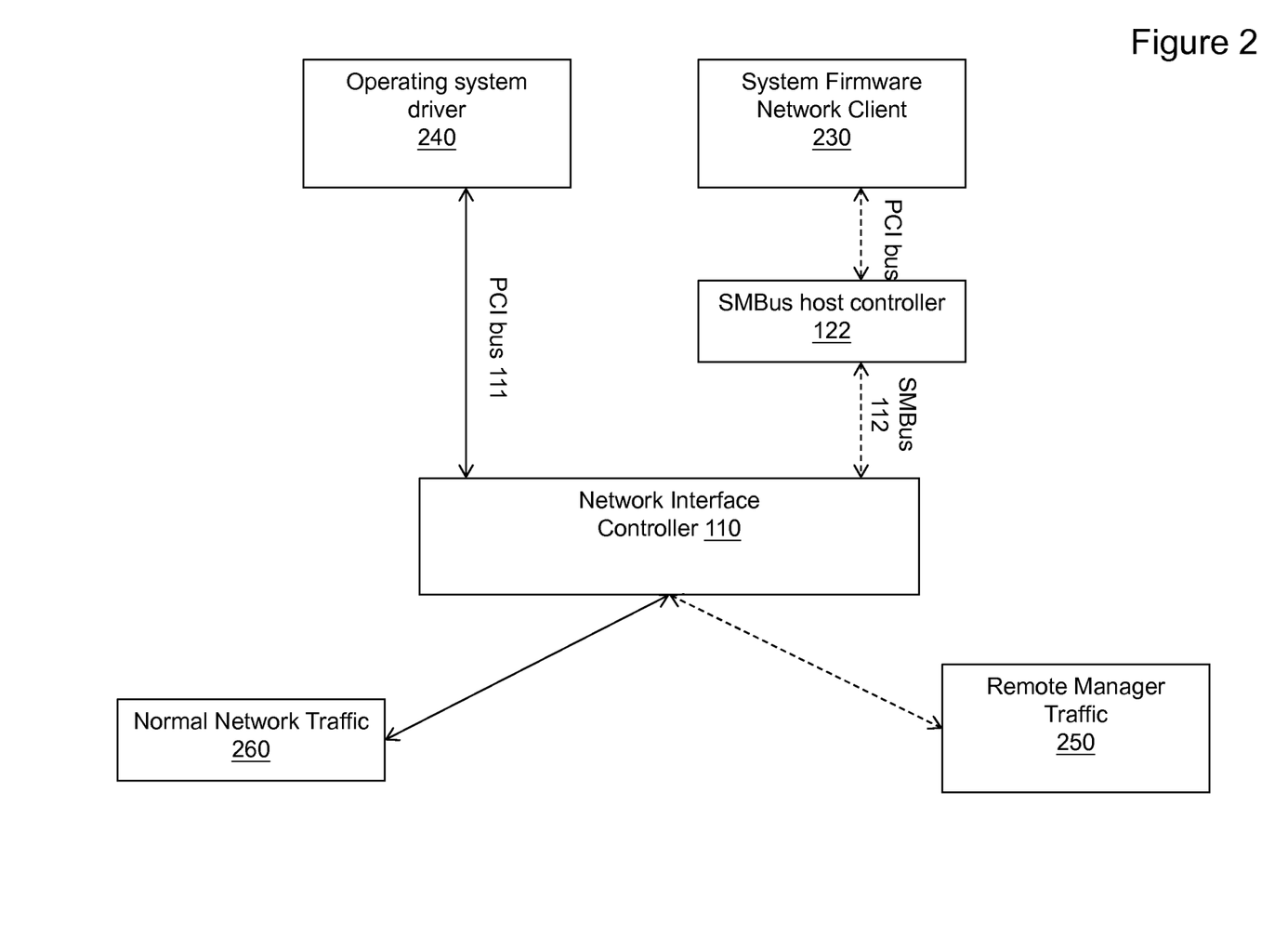
FIG. 2 depicts exemplary network traffic travelling through a shared NIC utilized in an embodiment of the present invention.

FIG. 2 depicts exemplary network traffic travelling through a shared NIC utilized in an embodiment of the present invention. Normal network traffic 260 arrives at the NIC 110 and is examined. After determining that the incoming network packet fails to satisfy the pre-configured filter conditions, the network packet is read from the NIC 110 by an operating system driver 240 (over PCI bus 111), and then passed up through the rest of the operating system's network stack to one of various running network clients. The network clients may then respond by sending out a network packet which is then routed through the network stack to the operating system driver 240, across the PCI bus 111 and out through the network interface provided by NIC 110.

Network traffic from a remote manager 250 is handled differently than the regular network traffic by embodiments of the present invention. The remote manager network traffic 250 is received by NIC 110 from the Ethernet port, and, if it has one or more of the pre-configured filter conditions (such as including a particular MAC address in the packet or a port of the packet matches a filter condition), the network packet is then re-directed across SMBus 112 as an SMBus packet to a pre-defined SMBus slave address. Upon receipt of the redirected packet, SMBus host controller 122 generates an SMI which causes a transition of CPU 150 into SMM. After the source of the SMI is detected (i.e., the receipt of an SMBus packet addressed to a specified SMBus address caused SMBus host controller to trigger the SMI), control is transferred to system firmware network client 230. System firmware network client 230 retrieves the SMBus packet from SMBus host controller 122 and then examines the contents of the SMBus packet. After examination, the system firmware transmits a reply SMBus packet. This reply SMBus packet is transmitted using SMBus host controller 122 over SMBus 112 to an SMBus slave address associated with NIC 110. NIC 110 assembles a network packet from the SMBus packet and places it in the queue to be transmitted via the network interface provided by NIC 110. The embodiments of the present invention thus are able to access NIC 110 with system firmware 190 instead of requiring the use of an external controller like a BMC. Once the connection is established, system firmware network client 230 can perform the functions of an IPMI, DASH or ASF controller from within SMM, such as controlling the system power-state, monitoring sensors, sending alerts and keeping an error log and report related information over the connection to a remote user or process.

Figure 3:
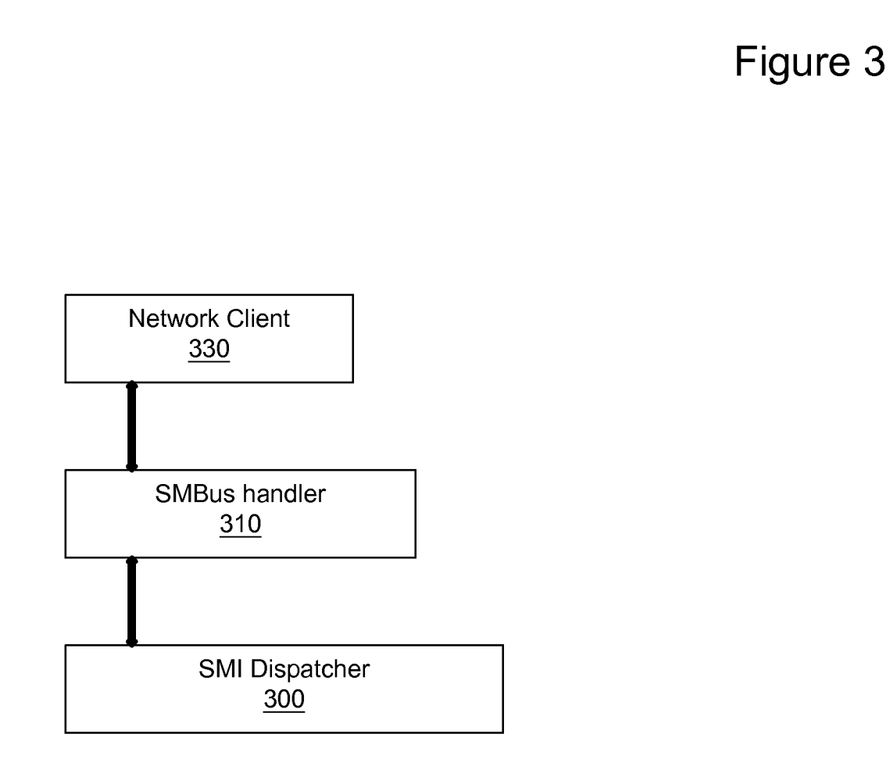
FIG. 3 depicts an exemplary software stack utilized by an embodiment of the present invention.

FIG. 3 depicts an exemplary software stack utilized by an embodiment of the present invention. The software stack provides the network client functionality within SMM. The software stack includes SMI dispatcher 300, platform bus (SMBus) handler 310 and network client 330. SMI Dispatcher 300 is a standard component in most x86 system firmware implementations. For example, SMI Dispatcher 300 is described in UEFI's Platform Initialization specification. SMI dispatcher 300 is responsible for detecting the source of an SMI by querying platform-specific hardware registers and then calling a handler registered by one of the child dispatch protocols such as EFLSMM_ICHN_DISPATCH_PROTOCOL (specified for various Intel chipsets).

In one embodiment, SMBus handler 310 registers a callback for two SMI sources. The first callback is for when an SMBus transaction is completed. SMBus host controller 122 can be configured to generate an SMI when an SMBus packet is received at a pre-defined SMBus slave address, or when an SMBus packet has successfully been transmitted. The second callback is when the General Purpose Interrupt (GPI) associated with the SMBus-defined SMBALERT# signal is toggled. This triggers an SMBus-defined procedure by which the alert source is queried.

Network client 330 is provided by the system firmware (as are SMI dispatcher 300 and SMBus handler 310) and is responsible for managing the network packets transmitted across the SMBus. Since network packets can be as long as 1536 bytes (for the Intel NIC), but SMBus packets on the SMBus on many platforms cannot be longer than 240 or 32 bytes, the network packets are broken up into fragments for re-transmission as SMBus packets across the SMBus. Network client 330 registers for notification with SMBus handler 320 when a packet is received. Network client 330 also may manage sending the next network packet (or fragment of a network packet) and handles various transmission errors. Network client 330 additionally may handle a number of standard network packets such as discovery packets. Network client 330 may be specific to a particular network controller or family of controllers, since the means of configuring the NIC and handling the network packet fragments may be proprietary. For example, the Intel NICs use an extension of the IPMI RCMP+ SMBus packet format.

Figure 4:
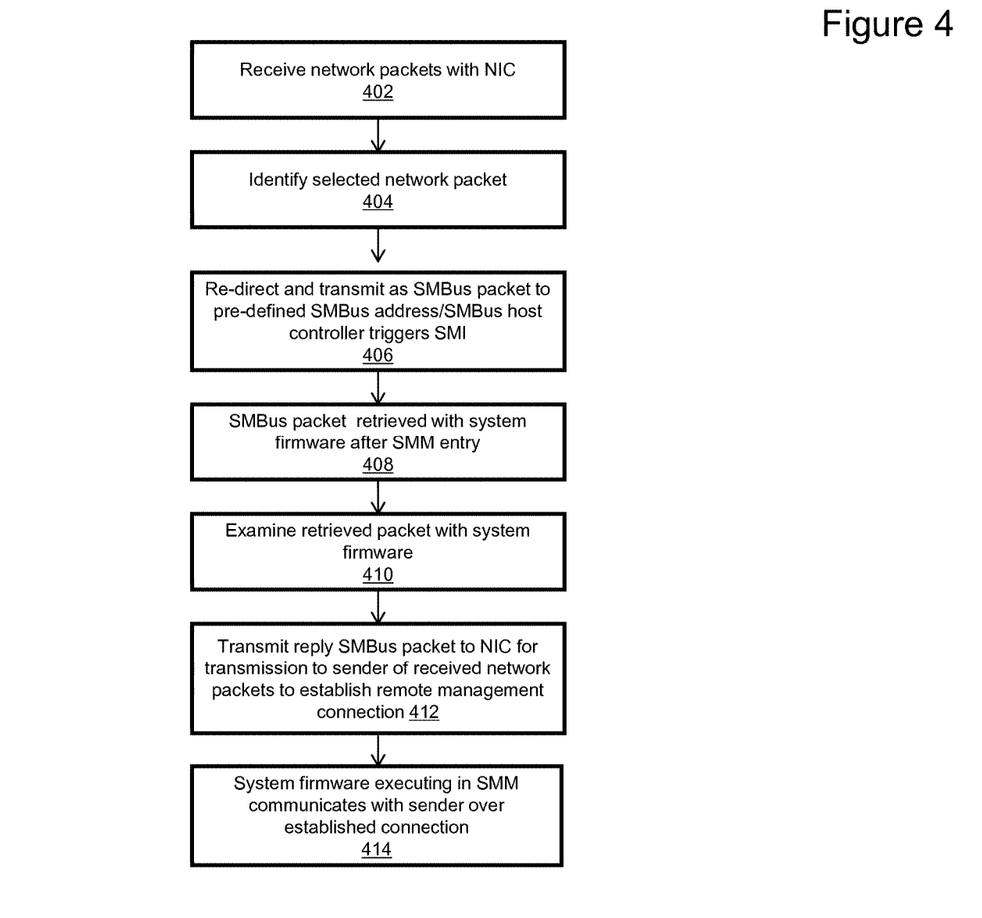
FIG. 4 depicts an exemplary sequence of steps followed by an embodiment of the present invention to establish a remote management connection using a shared NIC.

FIG. 4 depicts an exemplary sequence of steps followed by an embodiment of the present invention to establish a remote management connection using a shared NIC. The sequence begins when a network packet from a remote user or management process is received by the NIC (step 402). The packet is examined at the shared NIC to determine if it meets specified criteria (step 404). For example, the packet may be examined for a particular port or to see if it contains a particular MAC address. The packet contents may also be inspected as well for such information as SNMP indices. If the packet meets the specified criteria, it is re-directed and transmitted as an SMBus packet to a pre-defined SMBus address where an SMBus controller triggers an SMI upon receipt of the packet (step 406). After entry into SMM, the SMBus packet is then retrieved by system firmware from the SMBus host controller (step 408) and examined (step 410). A reply SMBus packet may then be sent by the system firmware over the SMBus to the shared NIC to be forwarded to the sender of the received network packets so as to establish a remote management connection between the sender and the system firmware (step 412). This reply may be an ACK or alternatively may contain initial configuration and capability information. Once the connection is established, it can be used by the system firmware operating in SMM to provide management information for the platform to the remote user or process (step 414).

While the embodiments discussed above have utilized an SMBus as on-platform transport, FML may also be used. FML is the Fast Management Link bus, which is a modified version of SMBus. Other platform buses may also be used when the on-platform bus is supported by the NIC and there is a platform bus host controller which can send and receive packets on this bus and generate an SMI# at the appropriate points during the transaction process so that the firmware network client can gain control. Exemplary alternative platform buses include, but are not limited to, Intelligent Platform Management Bus/Bridge (IPMB), CAN and eye-2-C. For example, IPMI describes the IPMB used for communication with BMCs. Similarly, LPC/SPI is a multi-target bus which may be used by an embodiment of the present invention.

While the embodiments described herein have discussed the use of SMM because of the availability of the dedicated interrupt which gives control back to the firmware, alternative embodiments not relying on SMM but that provide a firmware controlled non-maskable interrupt are also within the scope of the present invention. For computing devices with an ARM processor, TrustZone may be employed to give control to the firmware.

In another embodiment, the NIC may possess an enhanced auto-response that allows it to handle some forms of network traffic automatically. For example, the NIC may handle ARP traffic by automatically replying with a pre-defined MAC address, without transmitting those packets to the network client. This auto-response capability saves traffic over low-speed buses.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method for remote platform management, comprising:
   re-directing a selected network packet received via a network interface controller (NIC), the selected network packet re-directed and transmitted as a System Management Bus (SMBus) packet over an SMBus to a target associated with a pre-defined SMBus address;
   generating a System Management Interrupt (SMI) with an SMBus host controller upon receipt of the SMBus packet, the SMI triggering a transition to System Management Mode (SMM) by a central processor unit (CPU) in the computing device;
   retrieving the SMBus packet from the SMBus host controller with system firmware;

examining the contents of the retrieved SMBus packet with the system firmware; and transmitting, based on a result of the examination, a reply SMBus packet to the NIC, the reply SMBus packet assembled into a network packet at the NIC and sent via the NIC to a sender of the selected network packet to establish a remote management connection.

2. The method of claim 1 wherein non-selected network packets are read from the NIC by an operating system driver over a different bus.

3. The method of claim 1 wherein the system firmware performs at least one of controlling a system power state, monitoring a sensor, sending an alert and keeping an error log, and reports a result of the performing over the remote management connection.

4. The method of claim 1 wherein the selected network packet is selected based on one of a MAC address in the selected network packet and a port of the selected network packet.

5. The method of claim 1 wherein the re-directing of the selected network packet is based on one of a pre-configuration of the NIC to filter incoming network packets and an SMBus command sent to the NIC.

6. A non-transitory medium holding computer-executable instructions for remote platform management, the instructions when executed causing a computing device to:

retrieve a System Management Bus (SMBus) packet from an SMBus host controller with system firmware in response to a transition to System Management Mode (SMM) by a central processor unit (CPU) in the computing device, the transition to SMM occurring following a System Management Interrupt (SMI) generated by the SMBus host controller upon receipt of the SMBus packet from a network interface controller (NIC);

examine the contents of the retrieved SMBus packet with the system firmware; and transmit, based on a result of the examination, a reply SMBus packet to the NIC, the reply SMBus packet assembled into a network packet at the NIC that is sent via the NIC to a sender of the selected network packet to establish a remote management connection.

7. The medium of claim 6 wherein non-selected network packets are read from the NIC by an operating system driver over a different bus.

8. The medium of claim 6 wherein the system firmware performs at least one of controlling a system power state, monitoring a sensor, sending an alert and keeping an error log and reports a result of the performing over the remote management connection.

9. The medium of claim 6 wherein the selected network packet is selected based on one of a MAC address in the selected network packet and a port of the selected network packet.

10. The medium of claim 6 wherein the re-directing of the selected network packet is based on one of a pre-configuration of the NIC to filter incoming network packets and an SMBus command sent to the NIC.

11. A remotely managed computing device, comprising:

a central processing unit (CPU) supporting System Management Mode (SMM); a Network Interface controller (NIC) for receiving and transmitting network packets over a network, the NIC configured to re-direct and transmit a selected network packet received via the NIC as a System Management Bus (SMBus) packet over an SMBus to a target associated with a pre-defined SMBus address;

a SMBus host controller for managing the system management bus (SMBus), the SMBus host controller configured to generate a System Management Interrupt (SMI) upon receipt of the SMBus packet, the SMI triggering a transition to SMM by the CPU; and system firmware, which when executed:

retrieves the SMBus packet from the SMBus host controller, examines the contents of the retrieved SMBus packet; and transmits, based on a result of the examination, a reply SMBus packet to the NIC, the SMBus packet assembled into a network packet at the NIC and transmitted via the NIC to a sender of the selected network packets to establish a remote management connection.

12. The computing device of claim 11 wherein non-selected network packets are read from the NIC by an operating system driver over a different bus.

13. The computing device of claim 11 wherein the system firmware performs at least one of controlling a system power state, monitoring a sensor, sending an alert and keeping an error log, and reports a result of the performing over the remote management connection.

14. The computing device of claim 13 further comprising:

a temperature sensor on the CPU, wherein the system firmware reports a CPU temperature over the remote management connection.

15. The computing device of claim 11 wherein the selected network packet is selected based on one of a MAC address in the selected network packet and a port of the selected network packet.

16. The computing device of claim 11 wherein the re-directing of the selected network packet is based on one of a pre-configuration of the NIC to filter incoming network packets and an SMBus command sent to the NIC.

17. A computing device-implemented method for remote platform management, comprising:

re-directing a selected network packet received via a network interface controller (NIC), the selected network packet re-directed over a platform bus as a bus packet to a target associated with a pre-defined bus address;

generating a non-maskable interrupt with a bus host controller upon receipt of the bus packet, the non-maskable interrupt causing control of the computing device to shift to system firmware;

retrieving the bus packet from the bus host controller with the system firmware; examining the contents of the retrieved bus packet with the system firmware; and transmitting, based on a result of the examination, a reply bus packet to the NIC, the reply bus packet assembled into a network packet at the NIC that is sent via the NIC to establish a remote management connection.

18. The method of claim 17 wherein network packets are read from the NIC by an operating system driver over a different bus.

19. A non-transitory medium holding computer-executable instructions for remote platform management, the instructions when executed causing a computing device to:

retrieve a bus packet from a bus host controller with system firmware in response to a transition to system firmware control of the computing device, the transition to system firmware control occurring following a non-maskable interrupt generated by the bus host controller upon receipt of the bus packet from a network interface controller (NIC);

examine the contents of the retrieved bus packet with the system firmware; and transmit, based on a result of the examination, a reply bus packet to the NIC, the reply bus packet assembled into a network packet at the NIC that is sent via the NIC to establish a remote management connection.

20. The medium of claim 19 wherein network packets are read from the NIC by an operating system driver over a different bus.

* * * * *